(12) United States Patent
Huang et al.

(10) Patent No.: US 11,481,644 B2
(45) Date of Patent: Oct. 25, 2022

(54) EVENT PREDICTION

(71) Applicant: Nike, Inc., Beaverton, OR (US)

(72) Inventors: Ying-zong Huang, Seattle, WA (US); Vishal Doshi, Somerville, MA (US); Balaji Rengarajan, Campbell, CA (US); Vasudha Shivamoggi, Cambridge, MA (US); Devavrat Shah, Waban, MA (US); Ritesh Madan, Berkeley, CA (US)

(73) Assignee: NIKE, Inc., Beaverton, OR (US)

( * ) Notice: Subject to any disclaimer, the term of this patent is extended or adjusted under 35 U.S.C. 154(b) by 1174 days.

(21) Appl. No.: 15/844,613

(22) Filed: Dec. 17, 2017

(65) Prior Publication Data

US 2018/0240024 A1 Aug. 23, 2018

Related U.S. Application Data

(60) Provisional application No. 62/460,672, filed on Feb. 17, 2017, provisional application No. 62/460,697, filed on Feb. 17, 2017, provisional application No. 62/460,685, filed on Feb. 17, 2017.

(51) Int. Cl.
| | | |
|---|---|---|
| *G06F 16/22* | (2019.01) | |
| *G06F 16/24* | (2019.01) | |
| *G06N 5/04* | (2006.01) | |
| *G06N 20/00* | (2019.01) | |
| *G06F 16/242* | (2019.01) | |
| *G06F 16/2458* | (2019.01) | |

(52) U.S. Cl.
CPC ............ *G06N 5/04* (2013.01); *G06F 16/22* (2019.01); *G06F 16/2433* (2019.01); *G06F 16/2462* (2019.01); *G06F 16/2477* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,720,983 | B1 * | 8/2017 | Yu | G06F 16/24 |
| 9,785,696 | B1 * | 10/2017 | Yakhnenko | G06F 16/285 |
| 2002/0107839 | A1 * | 8/2002 | Heckerman | G06F 16/2462 |
| 2004/0220900 | A1 * | 11/2004 | Yang | G06F 16/2462 |
| 2010/0332408 | A1 * | 12/2010 | Ekhaus | G06F 16/2462 |
| 2011/0208841 | A1 * | 8/2011 | Robertson | G06F 16/252 |
| 2014/0278754 | A1 * | 9/2014 | Cronin | G06F 16/2471 |
| 2016/0171068 | A1 * | 6/2016 | Hardin | G06F 16/275 |
| | | | | 707/610 |
| 2017/0161639 | A1 * | 6/2017 | Zeng | G06F 16/9535 |
| 2017/0286494 | A1 * | 10/2017 | He | G06F 16/24537 |
| 2018/0082197 | A1 * | 3/2018 | Aravamudan | G06F 16/36 |
| 2018/0314954 | A1 * | 11/2018 | Subramanian | G06F 16/313 |

* cited by examiner

*Primary Examiner* — Son T Hoang
(74) *Attorney, Agent, or Firm* — Schwegman Lundberg & Woessner, P.A.

(57) ABSTRACT

A system includes at least one connector configured to gather at least partially incomplete data from at least one data source. The gathered data is communicated to a model definition module that converts at least a subset of the gathered data into a prediction model in accordance with a received definition. A prediction module receives a prediction query and, in response, supplies an event prediction based on the prediction model.

19 Claims, 6 Drawing Sheets

EU must be ready to impose sanctions on Ukraine - Czech minister

At least six people have died in occasional clashes between radicals and riot police in Kiev since protests erupted over Yanukovich's decision in November to drop a trade pact with the European Union and form closer economic ties with Russia.

EVENT PREDICTION

CROSS REFERENCE TO RELATED APPLICATIONS

The present application claims the benefit of U.S. provisional applications Nos. 62/460,672, 62/460,685, and 62/460,697, all filed on Feb. 17, 2017, the entire disclosures of each of which are incorporated by reference as if set forth in their entirety herein.

TECHNICAL FIELD

This invention generally relates to systems and methods for storing and analyzing data and, more particularly but not exclusively, to systems and methods for storing and analyzing data to make predictive queries on the data to predict events.

BACKGROUND

Data-driven decision-making has become an essential component for most organizations. Particularly, the past few decades have seen the creation of infrastructures and applications that allow organizations to access, collect, and store massive amounts of data. This has also led to the evolution of databases and data stores.

However, existing infrastructure for data-driven decision making is not without its disadvantages. For example, a large number of organizations store their data in differing locations and varying formats for a variety of reasons. This often makes extracting appropriate data challenging. Organizations therefore often expend a large amount of effort and resources into creating an effective "dataflow" in an appropriate normalized form from a database.

Another disadvantage of existing infrastructures is that data solutions are often replaced or otherwise become obsolete when new data sources become available. Or, when an existing data source degrades in quality, it can be catastrophic at worst and result in poor performance at best. This generally requires the entire process to be repeated and the infrastructure recreated which can be time-consuming and/or resource-intensive.

Yet another disadvantage of existing infrastructures is that, even when existing data sources are available, they may provide data in a variety of unstructured and multi-modal data formats. For predictive tasks, a common approach is to extract appropriate "features" from the unstructured data and to use a vector representation thereof for further analysis. This requires having in-house expertise to build such a solution and requires the maintenance of such infrastructure.

A need exists, therefore, for methods and systems for handling predictive tasks that overcome these disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a system for event prediction. The system includes at least one connector configured to gather at least partially incomplete data from at least one data source; a model definition module in communication with the at least one connector for receiving a definition and for converting at least a subset of the gathered data into a prediction model in accordance with the received definition; and a prediction module for receiving a prediction query and for supplying an event prediction in response to the received prediction query, wherein the supplied event prediction is based on the prediction model.

In some embodiments, each entry of the converted data is represented as a tuple that includes an operation and at least a first index value. In some embodiments, at least one tuple includes a second index value.

In some embodiments, the system further includes a data store for storing at least partially incomplete data, the data store in communication with a connector.

In some embodiments, the prediction query is an SQL query related to the at least partially incomplete data and the supplied event prediction includes at least one missing value of the data.

In some embodiments, the gathered data includes at least one of a numeric identifier, written text, location data, and imagery.

In some embodiments, the prediction model is updated upon the receipt of new gathered data.

In some embodiments, the prediction query is a time-series query related to data gathered over a time period and the event prediction includes a predicted future value.

In some embodiments, the prediction query is a classification-based query related to an entity and the event prediction includes a classification of the entity.

In some embodiments, the prediction query is a similarity-based query related to a first entity and the event prediction includes a second entity that is similar to the first entity.

In some embodiments, the prediction query is related to a new entity, and the event prediction includes a predicted attribute about the new entity.

According to another aspect, embodiments relate to a method for event prediction using a computer comprising a processor and a memory containing non-transitory instructions configured to be executed by the processor. The method includes gathering at least partially incomplete data from at least one data source using at least one connector; communicating at least a subset of the gathered data and a definition to a model definition module; converting, using the model definition module, the subset of the gathered data into a prediction module in accordance with the received definition; receiving a prediction query using a prediction module; and supplying, using the prediction module, an event prediction in response to the received prediction query, wherein the supplied event prediction is based on the prediction model.

In some embodiments, wherein each entry of the converted data is represented as a tuple that includes an operation and at least a first index value.

In some embodiments, at least one tuple includes a second index value.

In some embodiments, the method further includes storing the at least partially incomplete data in a data store that is in communication with the at least one connector. In some embodiments, the data store includes an SQL query application programming interface to service queries on the stored data.

In some embodiments, the gathered data includes at least one of a numeric identifier, written text, location data, and imagery.

In some embodiments, the method further includes updating the prediction model upon the receipt of new gathered data.

According to yet another aspect, embodiments relate to a method of predicting an event using a computer comprising a processor and a memory containing non-transitory instructions configured to be executed by the processor. The method includes receiving data from a plurality of data sources; representing the received data as a plurality of tuples that each include an operation and at least a first index value; receiving a query prediction related to an operation and at least a first index value; comparing the query prediction with at least one of the plurality of tuples; and transmitting a prediction value based on the comparison of the query prediction with at least one of the plurality of tuples.

In some embodiments, at least one tuple includes a second index value.

In some embodiments, the query prediction is represented as a tensor value defined by an operation, a first index value, and a second index value. In some embodiments, the operation represents a relationship between two entities in the data.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
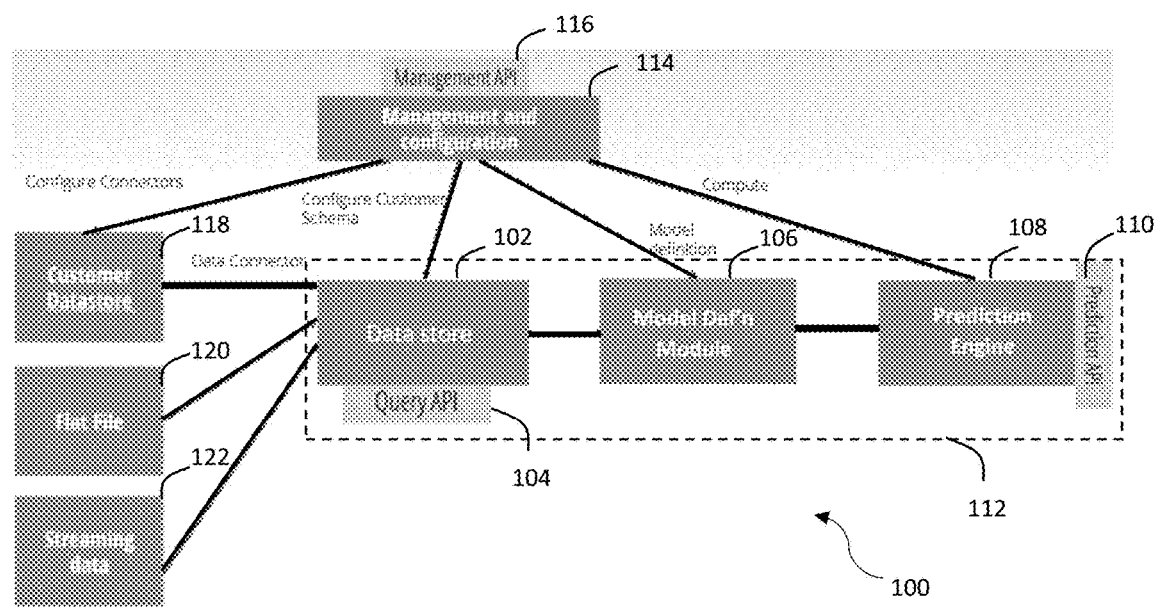
FIG. 1 illustrates a system for event prediction accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Features of various embodiments described herein provide an easy-to-use, flexible, and scalable infrastructure used to automate prediction tasks. This infrastructure can receive predictive queries and return predictions related to a variety of unstructured data types such as images, text, geo-spatial related data, or the like.

In the context of the present application, the terms "prediction queries" or "predictive queries" may refer to queries that provide responses reflecting the most likely outcome of some event. These are structured queries, that solicit responses that are predictive in nature based on statistical models built using relevant data.

In some embodiments, the goal of a prediction query may be to capture a relationship that explains the behavior of dependent variables in terms of independent variables: e.g., the price of a house determined based on factors such as location, number of rooms, square-footage, construction, previous renovations, etc.

These types of regression problems can be solved using predictive queries in accordance with various embodiments described herein. Executing a predictive query generally involves identifying the dependent and independent variables in the dataset, building appropriate statistical models, and then running the desired prediction queries against the models. Similarly, other popular predictive statistical questions such as classification, time-series forecasting, and matrix and tensor completion can be solved using the features of various embodiments described herein.

The returned predictive response(s) may also include a confidence score associated with the response as well as an explanation for the predictive response(s) so a user can understand why a particular predictive response was returned. Explanations may be useful when the predictive response(s) are used as a basis for further decision-making, particularly when further decision-making involves or requires the mobilization or consumption of resources.

The infrastructure described herein can integrate with existing data infrastructures and can accommodate different data sources in various environments. This allows further applications to a wide range of data-driven, predictive problems appearing in a variety of contexts.

The infrastructure described herein may support predictive queries without requiring an end user to perform different transformations over datasets for different predictive tasks. Additionally, features of various embodiments described herein allow for incremental updates to consider new data and can update the predictive responses accordingly.

FIG. 1 illustrates a system 100 for event prediction in accordance with one embodiment. The system 100 may include a data store 102 with a query application programming interface (API) 104, a model definition module 106, and a prediction engine 108 with a prediction API 110. The data store 102, the model definition module 106, the prediction engine 108 and the associated APIs may be collectively referred to as the prediction platform 112. The system 100 may further include a management and configuration module 114 with a management API 116, and may include or otherwise be in communication with a customer data store 118, one or more flat file(s) 120, and streaming data 122.

The data store 102 may store data in a form that allows for structured queries on native data using the query API 104. The data store 102 may represent each unit of data as a key-value paired tuple (similar to how a schema-less database stores data). These keys may possess a structure in the form of:

key=(operation, id=(id1, id2=None))

The key is a tuple that is made of up an operation field and an id field. The id field is tuple consisting of either a single id1 (and id2=None) or both id1 and id2.

The value(s) associated with each unit of data is stored as the value with its key. The value(s) can be of various data types including but not limited to numeric (e.g., numbers), vectors (e.g., a vector of numbers), categorical (e.g., a categorical data type with category represented as a string), text (e.g., text or string information), images (which can be a URL linking to image or raw data), and geospatial data (which may be represented in GeoJSON form).

The following illustrates how the above described format may store information about names of people. Exemplary data records may be:

(Name, (1,)): 'John Doe'
(Name, (2,)): 'Margaret Knew'
(Name, (3,)): 'John Malkovich'

This format may allow the storage of additional information about the above individuals such as their gender and/or their relationship with each other. For example, data regarding their gender may be stored as:

('Gender', (1,)): 'Male' (i.e., the gender of person 1, John Doe, is male), and
('Gender', (2,)): 'Female'

Data regarding the relationship between the above individuals may be stored as:

('Relationship', (1,2)); 'Married' (i.e., person 1 and person 2 are married)
('Relationship', (1,3)): 'Friends'

For example, a query to access a given key may take the form of:

find value when key=(operation, id2=None))

More generally, traditional queries may take the form of find all (key, value) for specific operation and id that satisfies certain conditions.

Using the schema and data above, a possible query could be:

Find all (key, value) for specific operation='Name' and id=(1,).

The response to which would be 'John Doe.'

Additionally, and discussed in more detail below, the schema allows for predictive queries. The most basic type of predictive query may be in the form of:

find predicted value when key=(operation, id=(id1, id2=None))

This would return a predicted value that is based on all data present in the system. The response is "predicted" even if there is an actual data entry present for the given key. For example, a predictive query may be in the form of:

find predicted value when key=('Gender', id=(3,))

The response to this query would be 'Male" (based on the sample keys above). Such a response would make sense as the system 100 knows that for id=(1,), 'John Doe' is the 'Name' and 'Male' is the 'Gender.' For id=(3,), 'John Malkovich' is the 'Name.' Given the commonality for 'Name,' it may make sense to predict 'Male.'

As discussed in more detail below in conjunction with GDELT data, the system 100 also supports predictive queries to find similarities between entities. A similarity-based, predictive query may take the form of:

find similarity score for id1 and id2 with respect to operation.

Or, another type of similarity-based query may return several "top" ids for a given id. For example, this type of query may be in the form of:

find top k similar ids for given id with respect to operation.

Data entries in the data store 102 may be viewed as a three dimensional "tensor." In the examples above, the operation field may take three different values: Name, Gender, and Relationship. These values may be indexed as 1, 2, and 3, respectively, and the id field may take values as 1, 2, and 3. Accordingly, the above data can be represented as a tensor $T=[T_{ijk}]$ in which:

$T_{11*}$='John Doe";
$T_{12*}$='Margaret Knew";
$T_{13*}$='John Malkovich';
$T_{21*}$='Male';
$T_{22*}$='Female'
$T_{312}$='Married', and
$T_{313}$='Friends.'

As seen above, if an entry is left undefined, the index may be used in the corresponding tensor. Accordingly, a predictive query can be written in the form of $T_{ijk}$=? or $T_{ij*}$=?. The response to a predictive query such as these therefore requires what is referred to as "tensor completion."

The above are merely examples of the types of data that may be stored as well as the types of prediction queries that may be considered in accordance with various embodiments described herein. While this is similar to schemaless or key-valued pair databases, the difference is that these above data formats have the ability to store interactions between multiple entities as a native schema and provide the ability to make predictive queries. This ability may be extended to common statistical problems such as regression, classification, time-series, and matrix and tensor completion, as discussed below.

The type of data stored in the data store 102 or retrieved by the connectors may of course vary depending on the application. In some embodiments, the data store 102 may include data related to the decisions and purchases of retail shoppers that may be leveraged to predict future transactions. In other embodiments, for example, the data store 102 may include comprehensive datasets that are based on public news sources.

In yet other embodiments, the data store 102 may store patient data that may be leveraged to make informative medical treatment recommendations. The data store 102 may also include data related to commodity or security prices to predict future price behavior. Again, these applications are only exemplary and it is contemplated that other types of data may be stored and used for other purposes.

The data sources that provide this data may of course vary depending on the application and data required. The various data sources may include, for example, the customer data store 118, flat file(s) 120, and streaming data 122. The data store 102 may be in operable communication with these data sources via any suitable data connectors. These data connectors may enable data ingestion for, e.g., bulk data file transfer, streaming data, and traditional databases such as, but not limited to, Cassandra, Elastic Search, and SQL databases. The data connectors may have the appropriate access to the data store 102, along with relevant schemas and cadence of ingestion.

The different types of data sources 118, 120, and 122 therefore allow flexibility in terms of data ingestion, and the data connectors can randomly access a specific location to retrieve certain data. For example, the data store 102 may obtain bulk data from flat file(s) 120 in a wide variety of formats such as CSV, JSON, AVRO, PARQUET, or the like.

In other embodiments, the data store 102 may obtain data via connections to various SQL and NoSQL databases 122. In some embodiments the data store 102 may obtain streaming data in a variety of formats such as AVRO, JSON, PARQUET, or the like. An operator may select specific data for retrieval and analysis based on his or her specific needs, or the system may automatically select specific data in the process of serving one or more prediction queries.

As mentioned previously, one of the disadvantages of existing database storage and analysis techniques is that databases often become obsolete or are otherwise unable to handle new, updated data. Accordingly, the system 100 can be configured to continuously ingest new data from the data sources 118, 120, and 122. As incremental data is ingested, the system 100 may perform additional computations to incorporate the new data into the data store 102.

An operator may set various update parameters using the management and configuration module 114 to specify any frequency for data retrieval on a global or per-source basis. For example, an operator may set the frequency of updates to hourly, daily, weekly, etc.

Features of various embodiments described herein include built-in, high quality "feature extraction" techniques for text, image, and geospatial data types. Accordingly, this allows the user of the multi-modal, unstructured data to receive predictions in a very effective manner within minimal effort. As discussed herein, the system 100 may view treat its data as a collection of three order tensors, with the value in each index being a high dimensional vector.

This is true regarding all different types of data. As discussed previously, various data sources available for use in these prediction tasks exist as unstructured data types including text, image, geospatial, etc. Each piece of unstructured data may be transformed into a vector that is potentially in a high-dimensional space (where the number of dimensions depends on the data type) such that the distances between vectors preserve similarities expected in the original, unstructured data space.

The data store 102 can solve multiple predictive tasks across stored data without the end user performing different transformations over the data for different prediction tasks. That is, once data is ingested into the data store 102, multiple predictive models can be built using the ingested data without any additional work required by the user to address the different formats of the original data sources.

The predictive tasks of interest depend upon the responses to predictive queries. As data changes, query responses will change. This is accomplished through incremental prediction model computation, which updates prediction models incrementally as data changes.

In addition to being incremental, the data store 102 may use a distributed computation environment to achieve scale. This distributed model provides robustness and flexibility. The data store 102 may automatically build models based on queries over many data types to allow fast and flexible decisions.

The features of various embodiments described herein may be utilized as a stand-alone database or as a software layer connecting with existing databases and data stores through plugins. This effectively leads to the creation of a common data interface or a data fusion platform for entities in which multiple databases and stores exist.

For example, and as mentioned previously, a large number of organizations store their data disparately for a variety of reasons. Therefore, extracting appropriate data in an ongoing manner to set up the first stage of their "dataflow pipeline" is often challenging. For this reason, a large amount of effort often goes into data engineering to create an effective flow of data from the applicable database to an appropriate, normalized form that is used to build a statistical model.

The system 100 of FIG. 1, on the other hand, provides the ability to connect with existing databases or data stores through a generic representation of the schema-less data. In other words, the data store 102 may act as a data fusion layer and data transformation is not required.

The model definition module 106 may be in communication with the data store 102 for receiving a definition and for converting at least a subset of the stored data into a prediction model in accordance with the received definition.

In the context of the present application the term "model" may refer to a collection of data that is used to make predictions. For example, in the realm of retail, the total quantity of a product purchased by a user is identified as the prediction target that captures the user's rating, which may be used for future predictions.

The model definition module 106 may perform any of the required transformations to transform the native data into a universal, internal format to allow for predictive queries. This model computation, with appropriate build-version, is stored in the system 100 and enables incremental updates with changes in data.

The prediction engine 108 may serve as the core computation module and is supported by a set of statistical algorithms. The prediction engine 108 may also be referred to herein as a "prediction module." The prediction engine 108 may be configured to receive a prediction query and supply one or more predictive responses to the received prediction query.

The management and configuration module 114 may provide the core system management APIs such as the management API 116. This permits operators to use various connector configurations and data schemas, set various parameters, initiate queries, or the like. This allows a user to make flexible use of the system 100 in, for example, a production environment.

The model definition module 106, in conjunction with the management and configuration module 114, may allow a user to define or otherwise build a model that will be used to support prediction queries. The model computation may include or otherwise be implemented with an appropriate build-version that enables incremental updates with changes in data. Accordingly, this addresses shortcomings of existing systems discussed above.

After or as data is ingested by the system 100, namely, by the data store 102, a user can build different prediction models. A user may, for example, use different pieces of and different model definitions. This can be done without any additional data engineering but instead by simply using the built-in capabilities of the system 100. For example, a user may use cross-validation techniques to assess the performance of multiple models to determine which model is best for the prediction task at hand.

Figure 2:
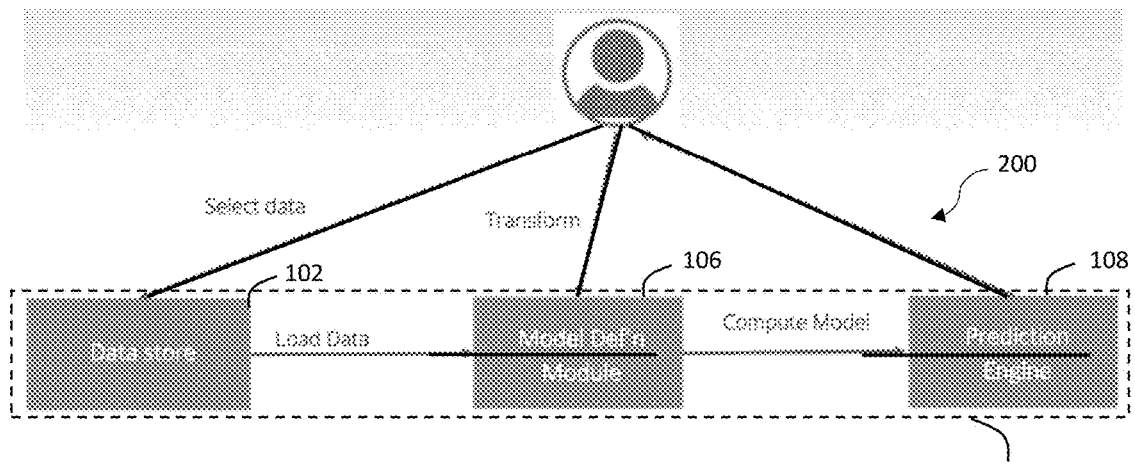
FIG. 2 illustrates an exemplary workflow using components of the system of FIG. 1 in accordance with one embodiment.

FIG. 2 illustrates an exemplary workflow 200 showing how a user may interact with the system 100 in accordance with one embodiment. For example, a user may select data on which a prediction is to be based from the data store 102 or from data obtained through any available connector. The model definition module 106 may allow the user to build or otherwise define a model to return a predictive response. Once the model is computed, the prediction engine 108 may perform any required predictive and/or cross-validation steps to return a response to a predictive query.

Figure 3:
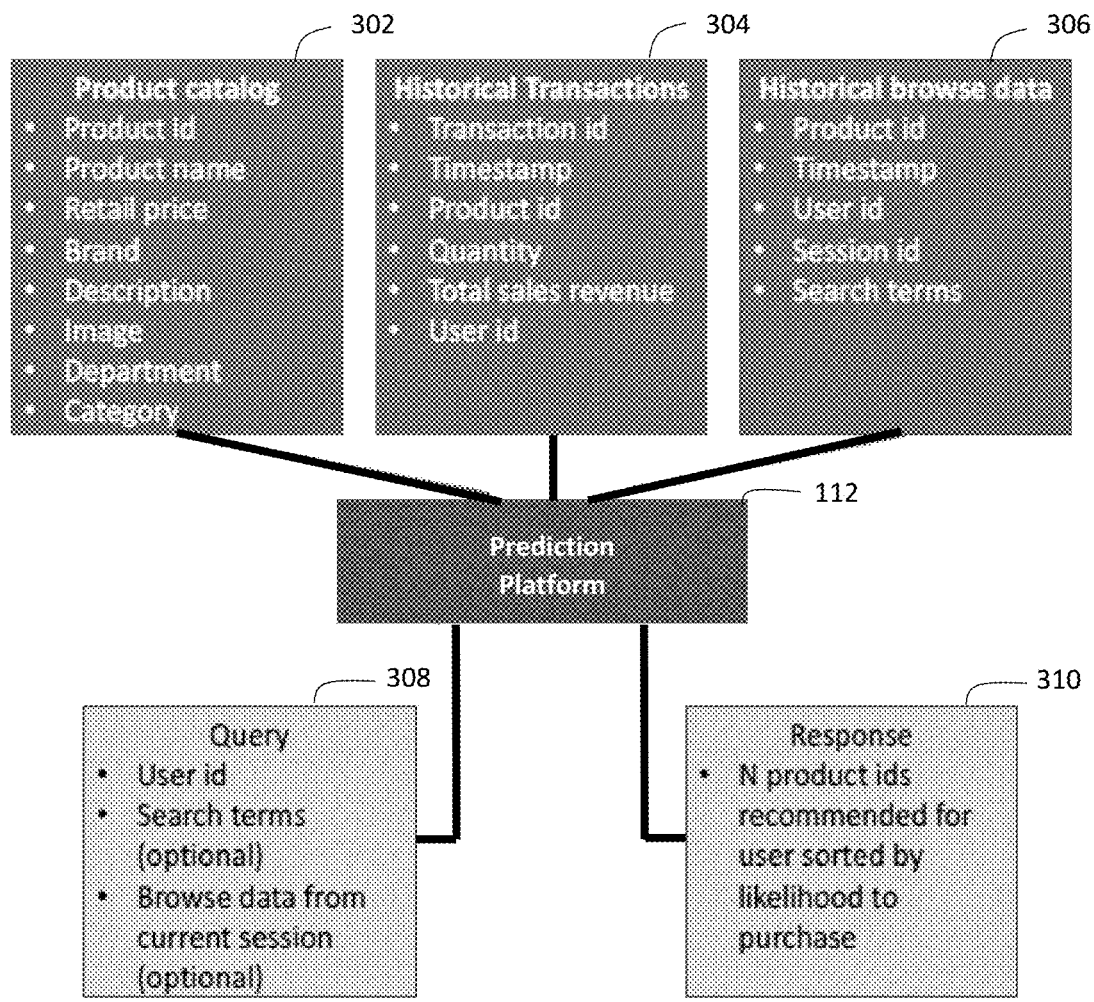
FIG. 3 illustrates an exemplary dataflow of the prediction platform of FIG. 1 in accordance with one embodiment.

FIG. 3 illustrates the prediction platform 112 of FIG. 1 in communication with different types of data sources in accordance with one embodiment. This data may include, for example, product catalog data 302, historical transaction data 304, and historical browse data 306.

Product catalog data 302 may include data such as product identification number, product name, retail price, brand, description, images, department, and product category (electronics, clothing, etc.). This data may be in the form of text, images, timestamps, numeric identifiers, etc.

Historical transaction data 304 may include data such as transaction identification numbers, transaction timestamps, identifications of products involved in transactions, quantity, total sales revenue generated, and user identification information (e.g., a user account identification label or an HTTP cookie).

Historical browse data 306 may include data such as product identification numbers, timestamps of browsing instances, user identification numbers, session identification numbers, search terms/keywords inputted by a user, and previous recommendations.

The prediction platform 112 may construct a predictive model that can then be queried to provide, for example, recommendations for products that are likely to be purchased by a particular user when presented with an appropriate predictive query.

Accordingly, the prediction platform 112 is also shown as receiving a predictive query 308. As with the previous examples, the predictive query 308 may relate to a particular shopper (e.g., as determined by a user identification), certain products in which the shopper may be interested, and data related to the browsing habits of the shopper.

The output of the prediction platform 112 may be the predictive response 310. As with the previous examples, the predictive response 310 responds to the predictive query 308 and therefore concerns certain products that a certain customer may be interested in and likely to purchase.

The prediction platform 112 can also respond to predictive queries that are based on different criteria. For example, a predictive query with just the target user identification may return general recommendations based on that user's historical interactions. Queries that include additional search terms entered by the user and/or data regarding recent products browsed by the user may generate context-dependent recommendations that are relevant to the current session.

Additionally, historical data on the products purchased by a user may be used as an indirect indicator of the user's opinion of or interest for a product. However, explicit ratings can also be considered.

The prediction platform 112 may therefore serve as a personalization system that can generate recommendations for users that are tailored to their individual preferences. This type of system has several applications such as recommending movies, music, books, items in a store, restaurants, etc.

Referring back to FIG. 1, the prediction platform 112 and, namely, the model definition module 106 in these types of applications may build an initial model to predict user preferences for (in the embodiment illustrated in FIG. 3), e.g., different products, through the prediction queries. The model definition may be created by, for example, specifying an entity for a requested prediction, as well as certain properties of data to be considered (for example, if a product were at issue, relevant properties may include price, description, images, or the like).

Additionally, the prediction platform 112 may execute (e.g., based on user input) certain procedures for transforming, filtering, and aggregating data based on the needs of the user. For example, when data is ingested by the data store 102, it can be assigned a certain confidence level that can decrease over time. For example, the data may be associated with a decay function so that results based on older data are associated with less confidence, and results based on newer data are associated with more confidence.

It may also make sense to utilize only a fraction of data to make predictive computations. The system 100 therefore allows a user to choose filters and perform selective computations based on filtered data only. The filters are very flexible and can provide a programmable experience to a user with minimal effort.

For example, a user may select a date range that includes the desired data. Additionally or alternatively, a user may configure the prediction platform 112 to use only the most recent n number of data entries for a prediction. These are only examples and the prediction platform 112 may be filter certain types of data for processing based on various parameters.

The prediction platform 112 may also apply specific transformations to the data before model computation. For example, the prediction platform 112 may be configured to use the aggregated number of product page visits (i.e., browsing occurrences) over a specified time period when building the model. All of these transformations may be applied automatically after being specified using an interface configured with the management and configuration module 114.

Additionally, and to reduce personnel time and financial cost, the system 100 offers the ability to retain and manage prior computations. Prior computations may hold value when attempting to understand the evolution of predictions over time with, e.g., changes in the data set. Studying evolving predictions requires the ability to save computed states. For example, a user can decide what computation is employed to satisfy a specific query. This way, the user can simultaneously compare predictions based on evolving data sets over time while the structure of the actual computation remains unchanging.

The system 100 may solve problems related to or otherwise using regression, classification, time-series, and matrix and tensor completion techniques. Examples of each are provided below.

Regression

The goal of a regression problem may be to predict an unknown label using a set of historical data and their corresponding labels. Table 1 below shows sample attributes for several patients such as their id number, age, gender, height, and weight.

TABLE 1

Sample Patient Data

| id | age | gender | height | weight | dosage |
|---|---|---|---|---|---|
| 1 | 45 | Male | 73 | 180 | 6 |
| 2 | 23 | Female | 64 | 125 | 2 |
| ... | ... | ... | ... | ... | ... |
| 100 | 62 | Female | 67 | 140 | 3 |
| 101 | 37 | Male | 71 | 170 | ? |

Table 1 also shows the known dosage amount for each patient. The dosage administered to each patient may be based on some combination of age, gender, height, and/or weight. The data in the first row of Table 1 (corresponding to patient number 1) may be expressed as:

('age', (1,)): 45
('gender', (1,)): 'Male'
('height', (1,)): 73
('weight', (1,)): 180
('dosage', (1,)): 6.

Data for the remaining patients may be similarly expressed.

In this embodiment, users such as medical personnel may want to know the appropriate dosage for patient number 101. The desired value (i.e., the dosage for patient number 101) is simply left blank in the dataset. The user may then input a predictive query to learn or otherwise predict the unknown dosage for patient number 101. To make the prediction to the system 100, a user may enter a predictive query in the form of:

('dosage', (101,))=?

The user may also define the schema or transformation required for the data to make the prediction. For example, the user may want the model to only consider certain columns of data. The prediction engine 108 may apply regression techniques and then return the appropriate dosage for patient number 101.

Classification

The goal of a classification problem may be to predict a class or category of an attribute. Classification problems in accordance with the infrastructure described herein may be implemented in ways similar to regression problems described above. In classification problems, the label to be predicted may take a numeric or vector value that represents the category of the data entry in question. The transformation applied to the data tuples may be identical to the one used for regression.

Matrix Completion

Matrix completion problems may use datasets involving interactions of some kind. In some embodiments, matrix completion problems may be prevalent in the retail space. For example, Table 2 below presents the purchasing history of several customers.

TABLE 2

Exemplary Shopper Purchase History

| Purchases | Shirt | Sweater | Jacket | Hat | Glove |
|---|---|---|---|---|---|
| Tim | 2 | | | 1 | 6 |
| Mary | | 1 | | 4 | 2 |
| ... | ... | ... | ... | ... | ... |
| Hank | 1 | 3 | 2 | | 3 |

A user may want to use the data of Table 2 to predict how many products a particular customer will purchase. For example, a user such as a retailer manager may want to know how many hats shopper Hank will buy. If this were framed as a regression problem, the mapping would follow the procedure described above with data records in the form of, e.g., ('Shirt', ('Tim')): 2. However, this approach would not take into account the fact that the columns of Table 2 denote entities that a customer has interacted with (i.e., purchased), as opposed to the attributes such as age or gender as in Table 1.

Accordingly, the data and structure of Table 2 can improve the quality of the generated predictions. For example, data regarding the first entry in Table 2 (i.e., the shopping history of shopper "Tim") can be converted into a key-value pair represented as:

('purchased', ('Tim', 'Shirt')): 2
('purchased', ('Tim', 'Hat')): 1
('purchased', ('Tim', 'Glove')): 6

And the predictive query:

('purchased', (Hank', 'Hat')): ?

can help answer questions such as "What is the likelihood that Hank will purchase a Hat?"

Tensor Completion

As with the previous example, a retail store manager may want to know how many of a specific product that a given customer may purchase. This problem was discussed above in conjunction with a "matrix completion" process, which works well when the only available data is purchasing history as in Table 2.

However, retailers and other organizations may be interested in and have access to other types of data that may have predictive power on purchasing patterns of shoppers. One of the advantages of the systems and methods described herein is the incorporation of data from different sources. For example, Table 3 below shows the browsing behavior of shoppers with respect to certain items.

TABLE 3

Shopper Browsing Behavior Data

| Browses | Shirt | Sweater | Jacket | Hat | Glove |
|---|---|---|---|---|---|
| Tim | 8 | | 1 | 4 | 13 |
| Mary | 2 | 5 | | 6 | 3 |
| ... | ... | ... | ... | ... | ... |
| Hank | 7 | 5 | 4 | 1 | 5 |

Browsing history may provide helpful information for retailers and organizations that can be leveraged to predict purchasing behavior. Moreover, this data can easily be incorporated by the components of the system 100. Similar to the above examples, data in the first row of Table 3 (relating to the browser behavior of "Tim") can be expressed as the tuples:

('browsed, ('Tim', 'Shirt')): 8
('browsed', ('Tim', 'Jacket')): 1
('browsed', ('Tim', 'Hat')): 4
('browsed', ('Tim', 'Glove')): 13

With this additional data, the answer to a predictive query such as ('purchased', ('Tim, 'Jacket')): ? can help understand the likelihood of Tim purchasing the 'Jacket.' Here, however, the prediction engine 108 may generate the answer by considering multiple data sources that are directly and indirectly relevant to the analysis.

The "browsing" behavior and the "purchasing" behavior data shown in Tables 2 and 3 are only two types of data that may be considered. For example, retailers or other interested parties may have access to other features about the customers and/or the products that can supplement the analysis accordingly. The mapping only requires two dimensions for the key as described in the regression use case above.

For example, features such as shopper gender, age, email subscription status (i.e., whether the shopper subscribes to an email service about a product, store, etc.), and shopper region may be considered. Exemplary tuples for shopper Tim with respect to these features may be written in the form of:

('feature_gender', ('Tim',)): 'male';
('feature_email_subscriber', ('Tim,)): 'no', and
('feature_region', ('Tim')): 'midwest.'

Features relating to products such as those shown in Tables 2 and 3 may be expressed in the same way. For example, data for the 'Hat' as shown in Tables 2 and 3 may include the respective department to which the 'Hat' belongs and the price of the product. This data may be similarly represented as:

('feature_department', ('Hat,')): 'outerwear'; and
('feature_price', ('Hat',)): '29.99.'

The model definition module 106 may therefore aggregate data from a plurality of data sources and use the size and structure of the keys to handle the interaction-type and the feature-type data correctly. Finally, a predictive query such as ('purchased', ('Mary', 'Jacket')): ?

can return an answer using all the available feature data.

Time-Series

The system 100 may also perform time-series forecasting predictions to describe how a single entity (such as a commodity price) changes over time. For example, Table 4 shows the price of a commodity at certain time intervals (e.g., at the end of each day).

TABLE 4

Commodity Price over Time

| time index | price |
|---|---|
| 1 | 2.10 |
| 2 | 2.70 |
| 3 | 3.50 |
| 4 | 3.60 |
| 5 | 3.40 |
| 6 | 3.50 |
| 7 | 3.50 |
| 8 | 3.70 |
| 9 | ?? |

A typical time-series prediction problem might be to predict the price of the commodity of Table 4 for a future day given the history in terms of daily price. As in the case of a matrix completion process, there may be more than one option for transforming this data for ingestion into the prediction database. The simplest approach may be to frame this question as a regression problem. In this case, the tuples may take the form:

('price', (1,)): 2.10
('price', (2,)): 2.70
('price', (8,)); 3.70 and the prediction for the price on the following day is simply a query for ('price', (9,)).

The mapping described above may generate a prediction based on the historical price data. As a single data entry (e.g., the price on the previous day only) may not provide much support for an accurate prediction of future price, the model may consider a number of previous days.

For example, the model may consider prices by their previous three days. Since every time step in the prior window may have predictive power over price, each window is modeled as a separate attribute. This essentially becomes a multivariate regression problem with the number of features equal to the number of time steps that are relevant to the prediction. Table 5 below shows how these additional features are constructed.

TABLE 5

Historical Price Windows of Commodity

| time index | current | 1 day ago | 2 days ago | 3 days ago |
|---|---|---|---|---|
| 1 | 2.10 | | | |
| 2 | 2.70 | 2.10 | | |
| 3 | 3.50 | 2.70 | 2.10 | |
| 4 | 3.60 | 3.50 | 2.70 | 2.10 |
| 5 | 3.40 | 3.60 | 3.50 | 2.70 |
| 6 | 3.50 | 3.40 | 3.60 | 3.50 |
| 7 | 3.50 | 3.50 | 3.40 | 3.60 |
| 8 | 3.70 | 3.50 | 3.50 | 3.40 |
| 9 | ?? | 3.70 | 3.50 | 3.50 |

Each row of Table 5 can be read as a daily observation of the commodity price along with the values of relevant features (i.e., the price on the prior three days). The mapping to the model may be the same as described above for the regression use case. The first row of Table 5 may be converted to a single record:

('current, (1,)); 2.10 and the second row may be mapped as:

('current, (2,)): 2.70
('1 day ago', (2,)): 2.10

The mapping for the remaining rows may proceed similarly. Each row may be mapped to a maximum of (in this embodiment) four records—one for the current time stage and up to three additional historically relevant time stages.

('current', (4,)): 3.60
('1 days ago', (4,)): 3.50
('2 days ago', (4,)): 2.70
('3 days ago', (4,)): 2.10

Additionally, there may be a set of tuples that correspond to the day of interest, day 9. As with other entries, this may be based on the price for:

('1 days ago', (9,)): 3.70
('2 days ago', (9,)): 3.50
('3 days ago', (9,)): 3.50 and the forecasting of the value at time index 9 is obtained through the query:

('current', (9,)): ?

As mentioned previously, various embodiments described herein may also consider geospatial data. For geospatial data, geospatial data strings in a GeoJSON format can be transformed into vectors and then sampled to make any required predictions.

Predicting News Events

In accordance with the above, features of various embodiments make predictions based on or otherwise related to news sources. Specifically, the system 100 may provide a simple approach to processing and leveraging public news datasets (e.g., GDELT) for previously inaccessible insights.

The GDELT dataset is a comprehensive collection of news sources from various broadcast, print, and online news sources. GDELT makes extensive use of, for example, AfricaNews, Agence France Presse, Associated Press, Associated Press Online, Associated Press Worldstreem, BBC Monitoring, Christian Science Monitor, Facts on File, Foreign Broadcast Information Service, The New York Times, United Press International, the Washington Post, and others.

Figures 4, 5:
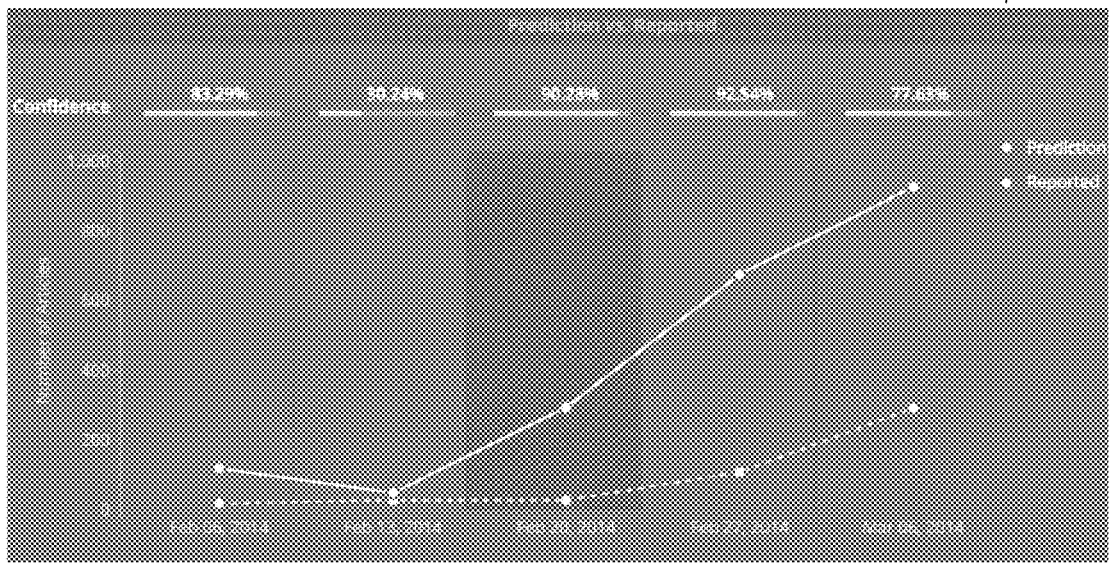
FIG. 4 depicts exemplary data records in accordance with one embodiment.
FIG. 5 depicts a graph showing predictions of articles regarding events compared to the quantity of actual articles in accordance with one embodiment.

The GDELT dataset is generated by processing news information and creating structured event records such as the records 400 of FIG. 4. The data records 400 relate to a number of news articles and include a plurality of headers. The GLOBALEVENTID is assigned as an identifier of the specific event or record. The SQLDATE represents the event date or time associated with the event. Each event is about interactions between two "state actors" (e.g., countries). For example Actor1CountryCode and Actor2CountryCode represents the two state actors between whom the event or interaction has happened.

Each of these interactions are classified into different types of events. They are represented though the headers EventRootCode, EventCode, and EventBaseCode.

At the finest level of classification of GDELT records, there are roughly 300 different types of interactions. Each event type has an associated GoldStein Scale and QuadClass value. The QuadClass values may classify events into a two-by-two quadrangle where events are either "verbal" or "material" in nature, and they are either "cooperative" or a "conflict." The quadrangle can be converted into numerical values with a "1" indicating a material conflict between two state actors, a "2" indicating a verbal conflict, a "3" indicating verbal cooperation, or a "4" indicating material cooperation.

The GoldStein Scale captures the intensity of the event in terms of its impact on the stability of the state actors involved in the event, with a "−10" being the highest level of negative impact on stability and a "+10" being the highest level of positive impact on the stability. Each record has NumArticles field recording the number of different news sources reporting the event; and AvgTone captures the negative to positive tone (from −100 to 100) of the reporting of the event.

The system 100 may consider data available from datasets such as the GDELT records 400 of FIG. 4 to make event predictions. A single record (e.g., the first row of FIG. 4), may be provided as:

1: (key1=RUS, key2=GEO, tablename=14: NumArticles. value=1, uniqueid=148867150:1;

2: (key1=RUS, key2=GEO, tablename=14: Avgtone. value=5.33, uniqueid=148867150:2;

3: (key1=14:NumArticles. tablename=QuadClass. Value=3. Uniqueid=14:NumArticles: QuadClass;

4: (key1=14: NumArticles. tablename=GoldsteinScore. Value=−6.5. uniqueid=

The first two records above simply represent the interaction between Russia (RUS) and Georgia (GEO) with code 14. The separation into the two records captures two values associated with the event: NumArticles and AvgTone. The remaining records are primarily capturing attributes of QuadClass and GoldSteinScore.

Such records are generated only once per event code. That is, when another record between two different state actors occurs with the event code 14, these records are not created as they already exist in the system 100. Therefore, in effect, the above transformation will effectively create twice the number of records compared to what is present in the original GDELT dataset.

In addition to GDELT, data from other types of data sources may be incorporated by loading the records in to the system 100 and transforming them into a compatible format (the transformation required may depend on the data itself).

As with the other types of data discussed above, the system 100 may continually receive new, updated data. As incremental data is ingested, the system 100 may perform any required additional computations to incorporate the new data. This can be adjusted to any desired frequency (e.g., hourly, daily, weekly, or the like).

One type of query of interest would be to predict missing entries or to correct existing entries. For example, a user may want to find the number of articles associated with Russia and Georgia for a specific event (e.g., an event labeled by "14") in a given time range. The query may be expressed as:

(key1=RUS, key2=GEO, tablename: 14:NumArticles, value=?).

The system 100 may produce an answer to this query as well as the degree of confidence associated with the answer. However, there may be cases in which the system 100 does not have information about this interaction. In that case, the answer is effectively a best estimate, as per all data available.

The confidence is expressed in terms of the standard deviation of the returned answer. The system 100 may also provide documentation explaining the data points that exist in the system along with the weights associated therewith utilized in generating the prediction, i.e., "witnesses." The witnesses are effectively used to explain why specific answers were returned.

Another type of query would be to find similarity between actors (e.g., countries, businesses, etc.) with respect to a given action. An example of this type of query would be finding state actors that are similar to Russia with respect to a specific event, say 14 in terms of the Number of Articles, in a given time range. In the query format explained above, finding the top 10 similar state actors could be expressed as:

(key1=RUS, tablename: 14: NumArticles, top-similar=10)

The system 100 may return a response to this query by listing a set of actors that are present in the dataset and that have similar behavior as Russia in terms of action 14, and the Number of Articles associated with it, with respect to all other state actors.

In another exemplary application, a user may want to predict the onset of an attack orchestrated by Russia in Ukraine in 2014. It is speculated that this attack began starting on Feb. 20, 2014. However, the news media was seemingly unaware of hostilities until some time later.

Accordingly, a user may consider a standard cross-validation setting and analyze the GDELT data in different time intervals leading up to and after the event date, Feb. 20, 2014. For example a user may consider five different time intervals that are each four weeks long. These intervals end on Feb. 6, 2014; Feb. 13, 2014; Feb. 20, 2014; Feb. 27, 2014; and Mar. 6, 2014. For each interval, the user may be interested in predicting the number of articles that should be reported about Russia attacking Ukraine. This query can be written as:

(key1=RUS, key2=UKR, tablename: 18:NumArticles, value=?)

The predicted responses for this query for each of the intervals, along with the true, reported values are shown in graph 500 of FIG. 5. For example, using the data through Feb. 20, 2014, the system 100 makes a prediction that there should be 296 articles about this event, with a standard deviation of 97. That is, there is a high signal to noise ration (close to 4). This makes sense with high confidence (90%+). However, as seen in FIG. 5 the actual number of articles reported is very small.

In the weeks around Feb. 13, 2014, however, the system 100 did not predict a higher number of articles (nor were there a higher number of articles). In the weeks after Feb. 20, 2014, the reported number of articles starts to increase as well as the predicted number of articles.

As a user observing predictions on Feb. 20, 2014, one might wonder if the prediction is meaningful or just a false alarm. To further investigate this, the system 100 may provide witnesses associated with the prediction.

Figure 6:
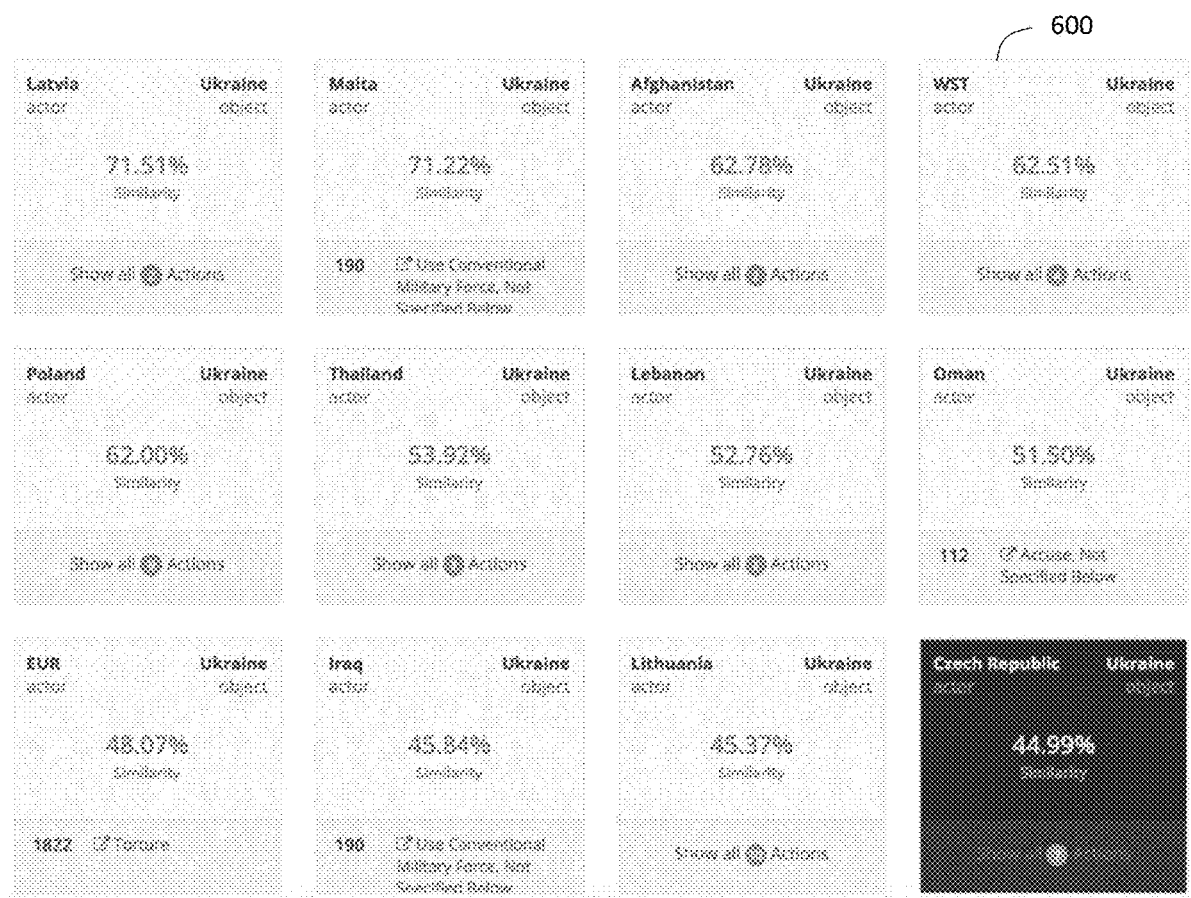
FIG. 6 presents a summary of witnesses for the predictions of FIG. 5 in accordance with one embodiment.

FIG. 6 represents a summary view 600 of witnesses associated with the prediction that there should be a large number of articles reporting Russia attacking Ukraine. The witness summary 600 is formatted for easy navigation and may be accessible using a graphical user interface. For example, by looking at the collated witnesses associated with Czech Republic and Ukraine, there are seven data points in GDELT that the system 100 believes are relevant to the prediction. These points are summarized in report 700 in FIG. 7.

Figures 7, 8:
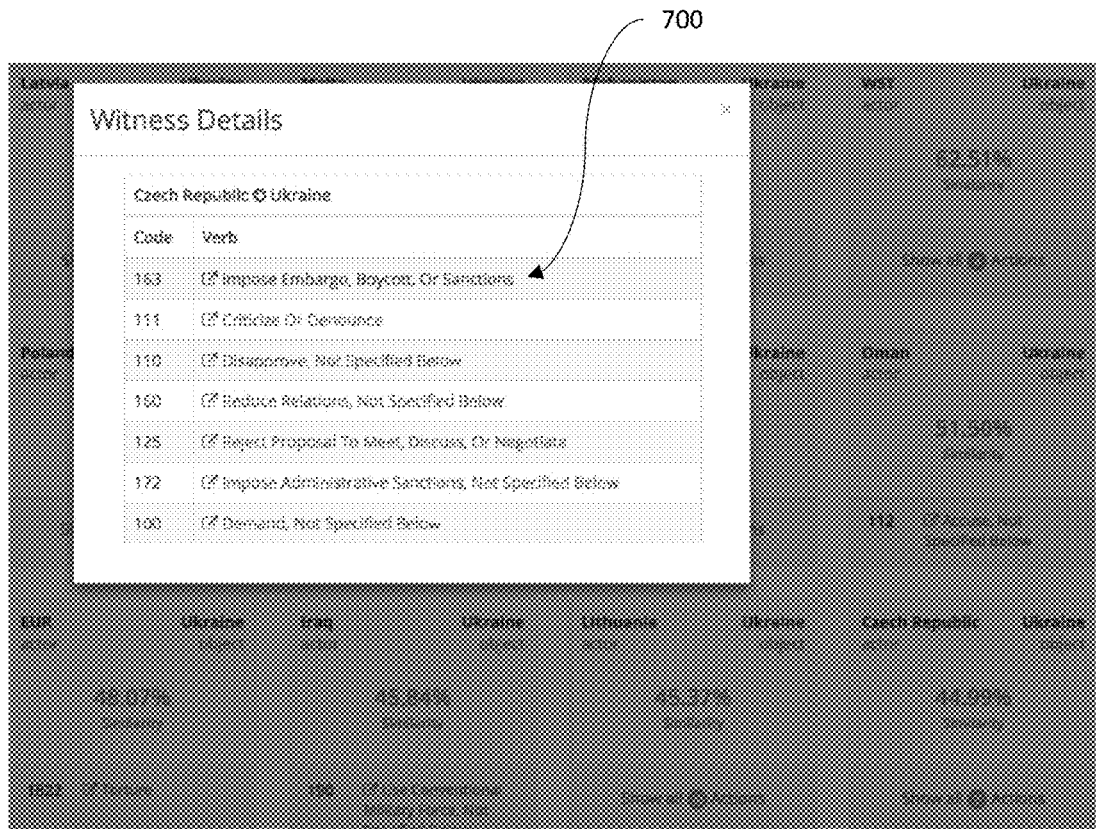
FIG. 7 depicts a report summarizing certain witnesses of FIG. 6 in accordance with one embodiment.
FIG. 8 depicts a screenshot of an exemplary article in accordance with one embodiment.

One of the witnesses, classified as event code 163 (root event code 16) is related to imposing an embargo, boycott, or sanctions. Upon further inspection of this record in GDELT, the user can view the associated news article, which is presented as an article 800 screenshot in FIG. 8. The user may click on a hyperlink that links to the article, for example. As seen in FIG. 8, the article 800 has pertinent information about the potential of Russia to cause instability in Ukraine, and is dated Feb. 10, 2014.

After seeing the prediction, and studying the witnesses, the user can decide whether the prediction (which in this case was a warning about the impending assault by Russia on Ukraine, is worth acting on. This decision may be based on the consideration of information external to the system 100.

In another use case, a user may use the system 100 to identify anomalies in an automated manner. In the context of the present application, the term "anomaly" may refer to a statistically significant deviation from normally-expected values.

Referring back to the data records of FIG. 4, the system 100 can track the similarities of the state actors over time. Accordingly, the system 100 can identify what is statistically normal and what is a statistically significant deviation from normal.

The similarities between each pair of state actors was tracked from Sep. 1, 2015 to Aug. 31, 2016 with respect to each root event code of interest. This amounts to tracking more than a million relationships over the time period. The desired data, in this embodiment, is simply the response of the similarity query between a pair of countries for a given action of interest during a given time interval.

Figure 9:
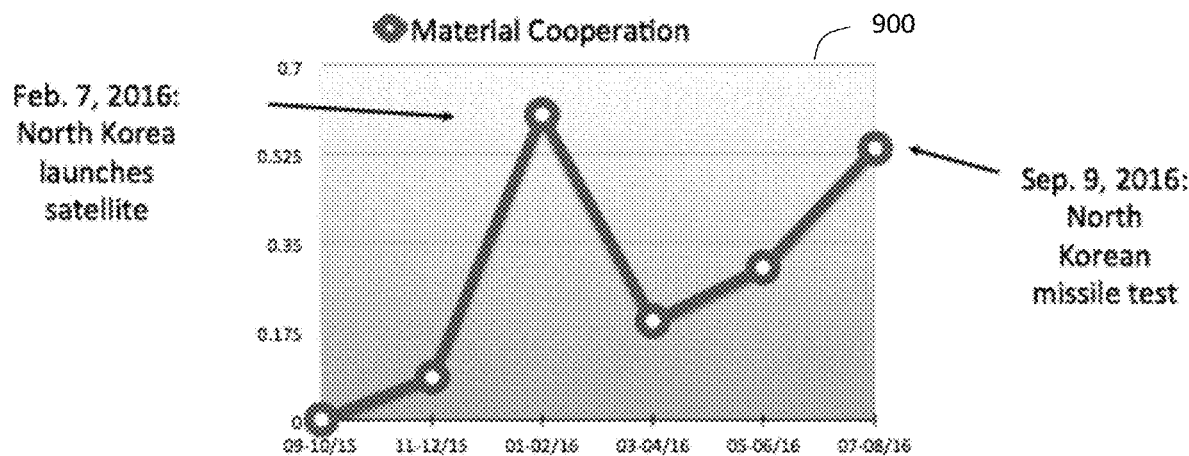
FIG. 9 depicts a graph showing similarity scores between two state actors in accordance with one embodiment.

Based on similarity scores between pairs of countries tracked over the year, simple post-processing (detecting deviation from the normal or null hypothesis) leads to the automatic identification of a small number of anomalies. FIG. 9 presents a graph 900 showing the similarity score on a scale of 0 to 1 (with "0" being not at all similar and "1" being very similar) between Russia and North Korea. The anomalous behavior between the two state actors with respect to material co-operation near the start of February, 2016 and the end of August, 2016 appear to coincide with two significant events—a North Korean satellite launch and a North Korean missile test.

It is worth remarking that there may be no data record of material cooperation between Russia and North Korea. However, the similarity relationship is built by looking at the overall behavior of Russia and North Korea with respect to all other state actors as well as all of their different actions.

Figure 10:
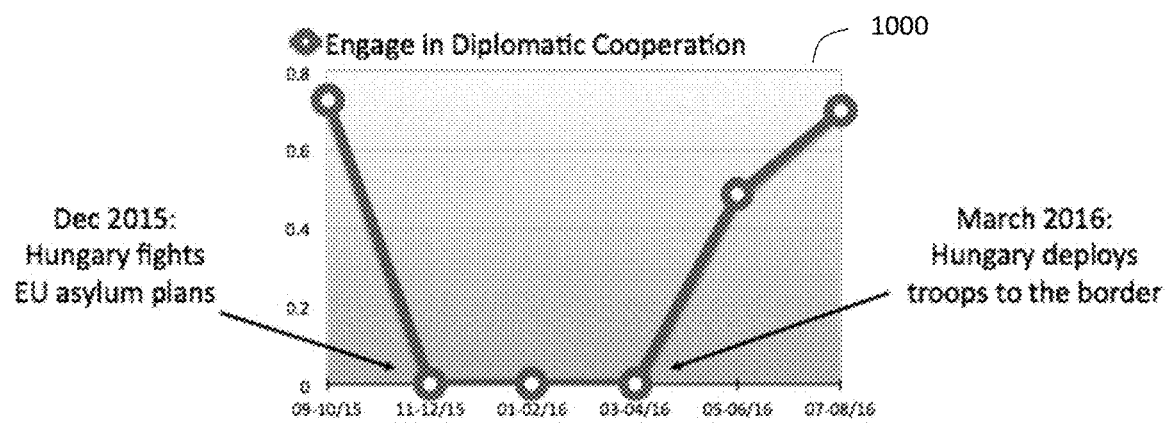
FIG. 10 depicts a graph showing similarity scores in accordance with another embodiment.

FIG. 10 presents a graph 1000 showing the similarity scores between Germany and Hungary with respect to diplomatic cooperation from September, 2015 to August, 2016. These are two friendly countries that are members of the EU. Because of this, it is expected that their similarity score would be very high in terms of diplomatic relationship. However, the system 100 found anomalous behavior around December, 2015 that lasts until April, 2016. Indeed, this interval of diplomatic conflict is marked by two events—the initiation of Hungary's plan to fight the EU asylum plan for Syrian refugees starting in December, 2015 and the deployment of troops at its border in March, 2016.

In this case, the system 100 may flag such statistically significant anomalies in real-time. GDELT, on the other hand, can only deliver daily alerts. The user can investigate further by, for example, by reviewing provided witnesses or otherwise determining that the anomaly is irrelevant. Most importantly, this technique removes the time intensive, cognitive burden of having to manually comb through millions of relationships daily. Instead, the system 100 provides a few significant, meaningful relationships to inspect for better, more informed decisions.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A system for event prediction, the system comprising:
a hardware processor; and
a memory storing non-transitory instructions, executed by the hardware processor, for:
ingesting at least partially incomplete unstructured data from at least one data source, the ingesting comprising transforming the at least partially incomplete unstructured data into a universal format that allows for structured predictive query processing, the transformed data comprising key-value pairs each comprising a key tuple and an associated value, the key tuple specifying an operation and at least one index value;
receiving a model definition and converting at least a subset of the ingested data into a prediction model in accordance with the received model definition;
incrementally updating the prediction model in response to incremental changes in the ingested data;
receiving a prediction query comprising a key tuple;
comparing the prediction query with at least one of a plurality of key tuples in the updated prediction model; and
generating and outputting the event prediction in response to the received prediction query based on the comparison, wherein the generated event prediction comprises at least an index value associated with an entity that is similar with respect to an operation specified in the key tuple of the prediction query to an entity associated with an index value specified in the key tuple of the prediction query.

2. The system of claim 1, wherein at least one of the tuples further specifies a second index value.

3. The system of claim 1, further comprising a data store for storing at least partially incomplete data, the data store in communication with a connector.

4. The system of claim 3, wherein the prediction query is a SQL query related to the at least partially incomplete data and the generated event prediction includes at least one missing value of the at least partially incomplete data.

5. The system of claim 1, wherein the ingested data includes at least one of a numeric identifier, written text, location data, and imagery.

6. The system of claim 1, wherein the prediction model is updated upon receiving new gathered data.

7. The system of claim 1, wherein the prediction query is a time-series query related to data gathered over a time period and the event prediction includes a predicted future value.

8. The system of claim 1, wherein the prediction query is a classification-based query related to an entity and the event prediction includes a classification of the entity.

9. The system of claim 1, wherein the prediction query is a similarity-based query related to a first entity and the event prediction includes a second entity that is similar to the first entity.

10. The system of claim 1, wherein the prediction query is related to a new entity, and the event prediction includes a predicted attribute about the new entity.

11. A method for event prediction using a computer comprising a processor and a memory containing non-transitory instructions configured to be executed by the processor, the method comprising:
   ingesting at least partially incomplete data from at least one data source using at least one connector, the ingesting comprising transforming the at least partially incomplete unstructured data into a universal format that allows for structured predictive query processing, the transformed data comprising key-value pairs each comprising a key tuple and an associated value, the key tuple specifying an operation and at least one index value;
   communicating at least a subset of the ingested data and a model definition to a model definition module;
   converting, using the model definition module, the subset of the ingested data into a prediction model in accordance with the definition;
   incrementally updating the prediction model in response to incremental changes in the ingested data; and
   receiving a prediction query using a prediction module, the prediction query comprising a key tuple;
   comparing the prediction query with at least one of a plurality of key tuples in the updated prediction model; and
   generating and outputting, using the prediction module, the event prediction in response to the received prediction query based on the comparison, wherein the generated event prediction comprises at least an index value associated with an entity that is similar with respect to an operation specified in the key tuple of the prediction query to an entity associated with an index value specified in the key tuple of the prediction query.

12. The method of claim 11, wherein at least one of the tuples further specifies a second index value.

13. The method of claim 11, further comprising storing the at least partially incomplete data in a data store that is in communication with the at least one connector.

14. The method of claim 13, wherein the data store includes a SQL query application programming interface to service queries on the stored data.

15. The method of claim 11, wherein the ingested data includes at least one of a numeric identifier, written text, location data, and imagery.

16. The method of claim 11, further comprising updating the prediction model upon receiving new gathered data.

17. A system of predicting an event comprising a processor and a memory containing non-transitory instructions configured to be executed by the processor to implement a method comprising:
   ingesting at least partially incomplete unstructured data from at least one of a plurality of data sources;
   transforming the at least partially incomplete unstructured data into a universal format that allows for structured predictive query processing, the transformed data comprising key-value pairs each comprising a key tuple and an associated value, the key tuple specifying an operation and at least a first index value;
   receiving a model definition and converting at least a subset of the ingested data into a prediction model in accordance with the received model definition;
   incrementally updating the prediction model in response to incremental changes in the ingested data;
   receiving a prediction query specifying comprising a key tuple;
   comparing the prediction query with at least one of a plurality of key tuples in the updated prediction model; and
   generating and outputting the event prediction, based on the comparison, wherein the generated event prediction comprises at least an index value associated with an entity that is similar with respect to an operation specified in the key tuple of the prediction query to an entity associated with the first index value specified in the prediction query.

18. The system of claim 17, wherein at least one key tuple in the transformed data further includes a second index value.

19. The system of claim 17, wherein the operation specified in the query represents a relationship between two entities.

* * * * *